United States Patent [19]

Hatakeyama et al.

[11] Patent Number: 4,930,089
[45] Date of Patent: May 29, 1990

[54] METHOD FOR IDENTIFYING COORDINATE DATA FOR SELECTED LOCATIONS ON PREPRINTED PAPER AND SUPPLYING THE DATA TO A PRINTER FOR PRINTING AT CORRESPONDING LOCATIONS

[75] Inventors: Motonobu Hatakeyama; Kohtaroh Yoshimura; Hidenori Naoi; Nobuo Wakasugi, all of Tokyo, Japan

[73] Assignee: Oki Electric Industry Co., Ltd., Tokyo, Japan

[21] Appl. No.: 166,478

[22] Filed: Mar. 10, 1988

[30] Foreign Application Priority Data

Mar. 11, 1987 [JP] Japan .................................. 62-54209
May 18, 1987 [JP] Japan .................................. 62-120723

[51] Int. Cl.$^5$ .............................................. G06F 3/03
[52] U.S. Cl. .................................................. 361/519
[58] Field of Search ............... 364/518, 521; 400/76, 400/279; 340/734

[56] References Cited

U.S. PATENT DOCUMENTS

| | | | |
|---|---|---|---|
| 4,564,302 | 1/1986 | Hatazawa | 400/76 |
| 4,618,275 | 10/1986 | Brinkmann et al. | 400/76 |
| 4,658,366 | 4/1987 | Posh | 400/279 X |
| 4,677,585 | 6/1987 | Ikegami et al. | 400/279 X |
| 4,745,491 | 5/1988 | Kishi et al. | 355/218 X |
| 4,763,165 | 8/1988 | Watanabe | 355/218 X |
| 4,794,424 | 12/1988 | Higaki et al. | 355/218 |

FOREIGN PATENT DOCUMENTS

| | | |
|---|---|---|
| 114723 | 8/1984 | European Pat. Off. . |
| 123109 | 10/1984 | European Pat. Off. . |
| 203314 | 12/1986 | European Pat. Off. . |
| 2926669 | 1/1981 | Fed. Rep. of Germany . |
| 3046037 | 7/1982 | Fed. Rep. of Germany . |
| 3113105 | 10/1982 | Fed. Rep. of Germany . |
| 3214805 | 10/1983 | Fed. Rep. of Germany . |
| 9788 | 1/1985 | Japan . |
| 262677 | 12/1985 | Japan . |
| 1318490 | 5/1973 | United Kingdom . |

OTHER PUBLICATIONS

"System P-G: der kompakte NC-Programmierplatz mit universeller Einsatzbreite" Christ, Siemens-Energietechnik Produktingormation 3 (1983) Mittlere Datentechnik. pp. 37–39.

"Handschriftliche Computereingabe ersetzt Terminal" Electronik 1980, Heft 17. p. 24.

"Computer liest Handschrift" Klein, Elektronic 17/1981, Datatechnik. pp. 77–79.

"Lightweight X-Y Positioner" Levine et al., IBM Technical Disclosure Bulletin, vol. 26, No. 7A, 12/1983, pp. 3321–3322.

Primary Examiner—Gary V. Harkcom
Assistant Examiner—Mark K. Zimmerman
Attorney, Agent, or Firm—Spencer & Frank

[57] ABSTRACT

In a method for inputting, into a printer memory, printing initiation positions for a standard preformed paper, a touch panel is superimposed upon a sheet of the standard preformed paper which has a printing format already printed on the paper. Coordinate data of printing initiation positions of the desired printing format are entered through contact with the touch panel by a touch pen. The touch panel produces input coordinate data which are input into the printer as printing format data.

13 Claims, 6 Drawing Sheets

PRIOR ART  FIG. 1
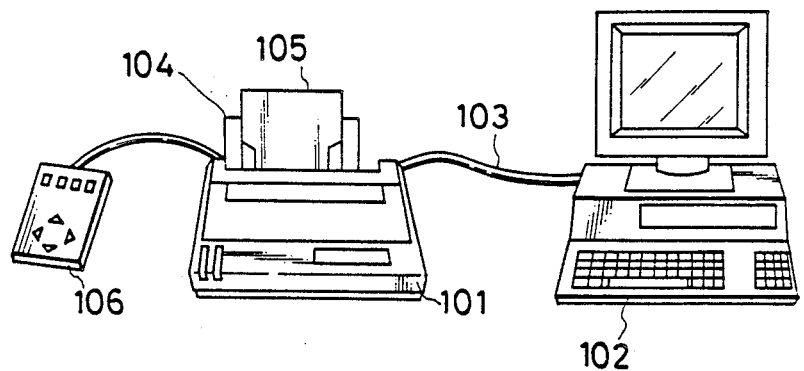
PRIOR ART  FIG. 2
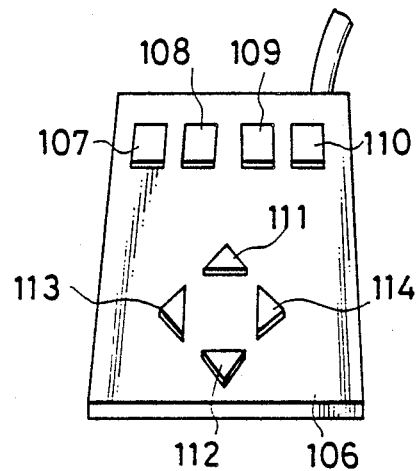

PRIOR ART   FIG.3
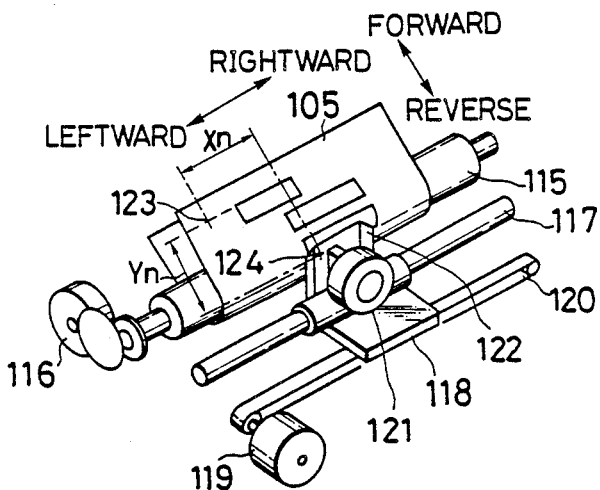
PRIOR ART   FIG.4A
"ABC" + LF
"DEF" + LF
"GHI" + LF
"JKL" + LF
PRIOR ART   FIG.4B
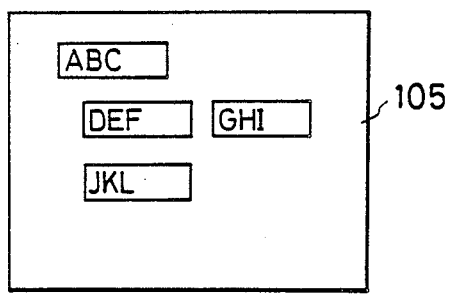

FIG.7
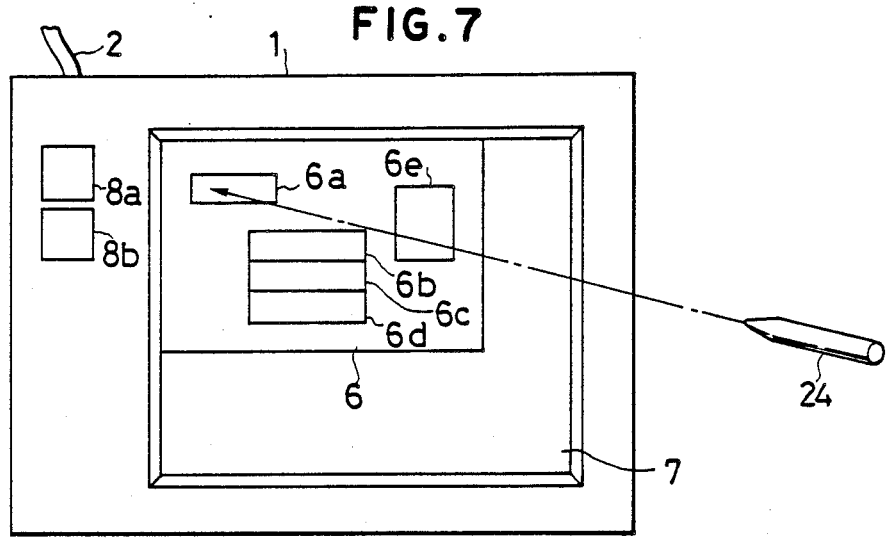
FIG.8A
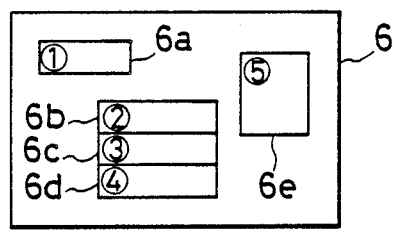
FIG.8B
"ABC" + LF
"DEF" + LF
"GHI" + LF
"JKL" + LF
"MNO" + LF
FIG.8C
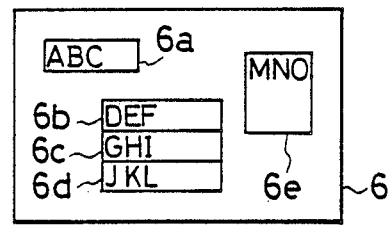

METHOD FOR IDENTIFYING COORDINATE DATA FOR SELECTED LOCATIONS ON PREPRINTED PAPER AND SUPPLYING THE DATA TO A PRINTER FOR PRINTING AT CORRESPONDING LOCATIONS

BACKGROUND OF THE INVENTION

The present invention relates to a printing format input method which is intended for inputting a printing format of a standard preformed paper, such as a paper for a slip print with frames preprinted on such paper.

Heretofore various printing-format input devices of the type shown in FIGS. 1-3 have been proposed for the above-mentioned printers. Among the above drawings, FIG. 1 is a perspective view of a known printing-format input device for a printer.

In this drawing, reference numeral 101 designates a serial printer which is connected to a host computer 102 via an interface cable 103. From host computer 102, the data is printed onto a standard preformed paper 105 which is guided by a guide 104.

The standard preformed paper may comprise one with preprinted frames, e.g., a slip-print paper.

Serial printer 101 in turn is connected to a format input keyboard 106 which is used for entering into the printer a printing format which is required for the standard preformed paper.

FIG. 2 is a detailed perspective view of the above-mentioned format input keyboard.

In the drawings, reference numeral 106 designates a format input keyboard. The upper part of the keyboard 106 contains a format input initiation switch 107, a paper set switch 108, a printing position setting switch 109, and a format input completion switch 110. The switches are arranged in a line with an equal pitch from each other. The lower portion of format input keyboard 106 contains switches which determine the direction of feed of paper and of the carriage, i.e., a paper forward feed switch 111, a paper reverse feed switch 112, a carriage leftward direction feed switch 113, and a carriage rightward direction feed switch 114.

FIG. 3 is a perspective view of a mechanism of the above-mentioned serial printer.

In this drawing, reference numeral 115 designates a platen which is fed from a paper-feed motor 116, so that standard preformed paper 105 can be fed in a forward or reverse direction. Installed parallel to the platen is a carriage shaft 117 which guides a carriage 118. The latter is moved along carriage shaft 117 from a carriage feed motor 119 through a carriage drive belt 120. Carriage 118 supports a printing head 121 and a ribbon protector 122.

The device described above operates in the following manner:

When a format input initiation switch 107 on the format input keyboard 106 is depressed, serial printer 101 detects the depressed position of the above-mentioned format input initiation switch 107, and is set to a printing format input mode.

When under this condition, the paper guide 104 of the printer 101 is shifted to a predetermined position, the paper is fed along the guide 104 from the rear side of platen 115, and the paper set switch 108 is depressed, the platen 115 begins to rotate, being driven by paper feed motor 116, and standard preformed paper 105 begins to move in a direction perpendicular to carriage shaft 117. At the same time, carriage 118 is fed in a horizontal direction along shaft 117 from carriage feed motor 119 via carriage drive belt 120. Paper feed motor 116 and carriage feed motor 119 stop when a predetermined, printing initiation possibility position 123 on the paper, coincides with a printing initiation position setting mark 124, which is disposed on the ribbon protector 122 on carriage 118.

When forward direction paper feed 111 is depressed, the standard preformed paper 105 begins to be driven by paper feed motor 116 in the forward direction with regard to the position shown in FIG. 3, while with the depression of the reverse paper feed switch 112, the paper begins to move in the reverse direction.

With the depression of the carriage rightward direction feed switch 114, carriage 118 will be driven by carriage feed motor 119 to the right with regard to the position shown in FIG. 3, while with the depression of the carriage leftward direction feed switch 113, the carriage will move to the left.

By operation of the above-mentioned feed switches 111–114, it is possible to align the printing initiation position within a printing border (or frames) which have been preprinted or applied onto the paper, using the printing initiation position setting mark 124 on the ribbon protector 122. When printing position set switch 109 is depressed under this condition, a horizontal distance Xn and vertical distance Yn from the printing initiation possibility position 123 to the printing initiation position, will be put into the memory of the printer, and in this manner the printing initiation position is set.

When such setting of printing initiation positions is repeated a required number of times, and finally format input completion switch 110 is depressed, the standard preformed paper is discharged from printer 101, and input of the format is completed.

After inputting the format, printing of the printing data, which has been transmitted from host computer 102 via interface cable 103, is made at the printing initiation positions, in sequence starting with the minimum value of vertical distance $Y_n'$ and with the minimum value of horizontal distance $X_n$. Each time when a new LF code (OA[hexadecimal notation]) shown in FIG. 4A is received, transition is made to the next printing initiation position to perform format printing, and a printing result shown in FIG. 4B is obtained.

Because the construction described contemplates setting of the printing initiation position by moving a printing initiation position setting mark on a carriage of a serial printer, such a construction is applicable only for serial printers. In addition, an actual displacement of the paper will differ from the value of the feed because of mechanical play in the mechanisms of the printer. Therefore, the printer is subject to deviation from the set format.

SUMMARY OF THE INVENTION

In view of the above, it is an object of the preset invention to solve the above problems and to provide a printing format input method which does not require special selection of a printer and which can input the format with high reliability and ease.

Another object of the invention is to provide a method for inputting printing format data to a printer in which the data can be entered onto a standard preformed paper which is larger in size than the touch panel.

The above object is achieved by providing a touch panel tablet having a touch panel with which a standard preformed paper can be superimposed for inputting coordinate data for printing initiation positions by contact with a touch pen.

First, the above-mentioned touch panel tablet is superimposed onto a standard preformed paper.

A required printing initiation position on the standard preformed paper is then depressed by contact with a touch pen. This operation causes inputting of the coodinate value of the printing format initiation position on the standard preformed paper to the printer.

The above-described method makes it possible to provide reliable format printing and eliminate the problems associated with prior art.

BRIEF DESCRIPTION OF THE DRAWINGS

FIG. 1 is a perspective view showing a conventional printing format input device.

FIG. 2 is a perspective view showing a keyboard for format input.

FIG. 3 is a perspective view schematically showing mechanical parts of the printer.

FIGS. 4A and 4B are diagrams for explaining the operation of the conventional device.

FIG. 7 is a plan view showing a touch panel tablet.

FIGS. 8A, 8B and 8C are diagrams for explaining the operation of the device.

DETAILED DESCRIPTION OF THE PREFERRED EMBODIMENTS

The invention will now be described in detail with reference to an embodiment illustrated in the attached drawings.

Figure 5:
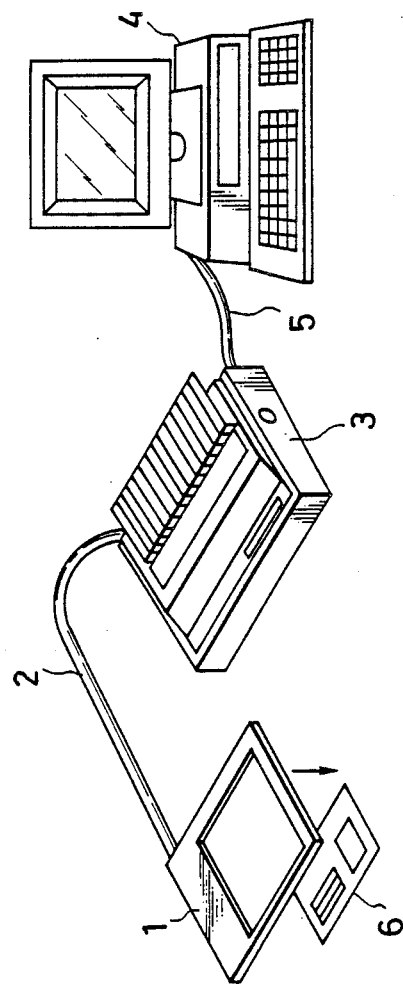
FIG. 5 is a perspective view showing a printing format input device used in an embodiment of the invention.

FIG. 5 shows a printing format input device used in an embodiment of the invention, together with a printer. In this drawing, reference numeral 1 designates a printing format input device which comprises a so-called touch panel tablet. The data which is introduced through the above-mentioned printing format input device 1 is transmitted to a printer 3 via an interface cable 2.

Reference numeral 4 designates a host computer. The host computer transmits printing data to printer 3 via an interface cable 5.

Reference numeral 6 designates standard preformed paper which has a preprinted format, i.e., preliminarily printed frames for data which has to be within these frames. All this data is supplied to printer 3.

Figure 6:
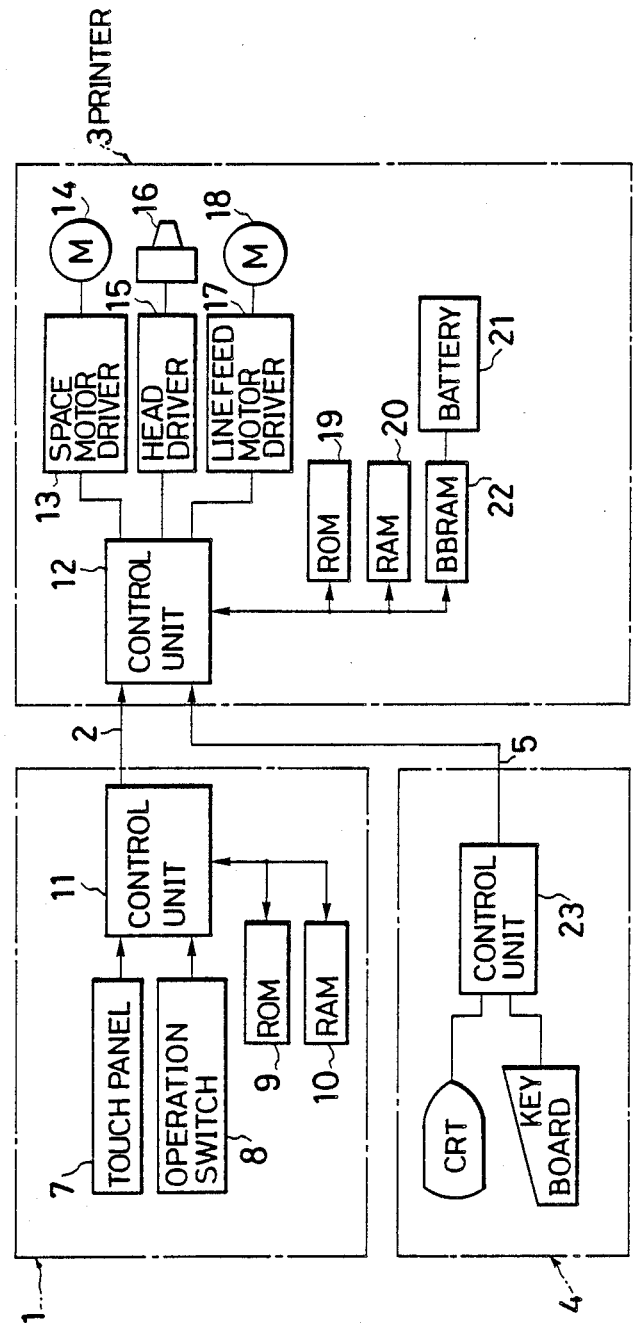
FIG. 6 is a block diagram showing a control system of for the printing format input device.

FIG. 6 is a block diagram which shows block elements incorporated in units shown in FIG. 5, i.e. the printing format input device 1, the printer 3, and the host computer 4. As seen from this drawing, the printing format input device 1 includes a transparent touch panel 7 which is formed of electrodes arranged in a matrix form and capable of entering coordinate data when touched by a touch pen. The format printing input device 1 also includes an operation switch 8, a read-only memory 9 (hereinafter referred to simply as ROM 9) which incorporates a control program for the device, a random-access memory (hereinafter referred to as RAM) 10 which stores the printing format data introduced from the above-mentioned touch panel 7, and a CPU, i.e., a control unit 11 of the printing format input device 1. Control unit 11 is connected to a control unit 12 of printer 3 via interface cable 2.

Printer 3 is also provided with: a space motor 14 connected to the above-mentioned control unit 12 via a space motor driver 13; a printing head 16 connected to control unit 12 via a head driver 15; a line-feed motor 18 connected to control unit 12 via a line-feed motor driver 17; a read-only memory 19 (hereinafter referred to simply as ROM 19) which stores a control program for the printer 3; a random-access memory 20 (hereinafter referred to simply as RAM 20) which stores printing data, and a random-access memory (BBRAM) 22 backed up by a battery 21 for storing printing initiation positions. Host computer 4 has a control unit 23 which is connected to control unit 12 of printer 3 via interface cable 5.

In the course of printing, on the basis of a command from control unit 12, space motor 14 of printer 3 is driven from space motor driver 13 and causes reciprocation of printing head 16 together with a carriage (not shown) along a platen (also not shown in the drawings) of the printer 3.

Head driver 15 drives printing head 16 also on the basis of printing data received from control unit 12. As a result, the printing head prints characters on a conventional paper, or the standard preformed paper 6 which is applied onto a platen and is moved by the latter. Line-feed motor 18 is driven by a line-feed motor driver 17 on the basis of a command from control unit 12. As a result, the above-mentioned conventional paper or standard preformed paper 6 which is set on the platen of the printer 3 is moved by means of the above-mentioned platen.

FIG. 7 is a front view illustrating conditions of entering the printing format data by means of printing format input device 1. In this drawing, reference numerals 8a and 8b designate switch keys which form together with switch circuits (not shown in the drawings) an operation switch unit 8 shown in FIG. 6. In the illustrated case, 8a is an input initiation key and 8b is an input completion key.

Reference numerals 6a–6e designate frames which are preliminarily printed on standard preformed paper and define the printing format to be input; 24 is a touch pen which is used for inputting coordinates at the point of contact of the pen 24 with touch panel 7.

The following method is used for inputting the printing format data by means of the device described above:

When input initiation key 8a of printing format input device 1 is depressed by finger, the depression signal is detected by control unit 11, which in accordance with the control program on ROM 9, keeps track of operation of touch panel 7 and operation switch unit 8. As a result of this action, control unit 11 transmits an input initiation signal through interface cable 2 to control unit 12 of printer 3.

When control unit 12 of printer 3 receives the above-mentioned input initiation signal, then in accordance with the control program of ROM 19, the mode of operation of printer 3 is converted from an ordinary printing data receiving/printing mode to a printing format data input mode.

The printing format input device 1 is then superimposed onto the standard preformed paper 6 which is laid, e.g., on a table, so that as shown in FIG. 7, a predefined reference point, e.g., the left upper corner of touch panel 7, is aligned with the origin of coordinates, e.g., the left upper corner of the standard preformed paper 6.

Because the coordinates on touch panel 7 correspond in a 1:1 ratio to printing areas of printer 3, various printing initiation positions within the boundaries of frames preprinted on the paper can be entered through coordinates of touch panel 7 by means of touch pen 24. When these coordinate points are touched by the touch pen 24, their values are sequentially read by control unit 11. The read-out coordinates are then transmitted through interface cable 2 as printing format data to control unit 12 of printer 3.

If control unit 12 cannot receive the signal at this moment, the above-mentioned printing format data is temporarily stored in RAM 10 of printing format input device 1. When the above-mentioned control unit 12 is in condition ready to receive the signal, the latter is transmitted from RAM 10 through control unit 11 to control unit 12.

When the printing format data is transmitted to control unit 12 of printer 3 in the manner described above, control unit 12 converts the received printing format data into printing positions within the printing area. This data is then stored as printing initiation position data in BBRAM 22. As the above-mentioned data conversion and storing process is repeated each time the data is entered by touching panel 7 with touch pen 24, the printing initiation position data are stored in the order of entering of the data. Thus, printing format data for standard preformed paper 6 is entered into printer 3 from printing format input device 1, and thus the printer is set for a required printing format.

When input completion key 8b is depressed after completion of entering the data through touch panel 7, the key depression signal is detected by control unit 11 of printing format input device 1, and from control unit 11 the input completion signal is transmitted to control unit 12 of printer 3. As a result, by means of control unit 12, printer 3 is returned from the printing format data input mode to the ordinary data receiving/printing mode.

The printing format data inputting operation is now completed, and after the printing format is set in the manner described above, printing format input device 1 can be separated from printer 3, and even when the printer 3 is disconnected from any electrical outlet, the printing format once set will be stored in BBRAM 22 by battery 21. Therefore the printer will be able to operate with the above-mentioned format after connection of the source of supply for the second time.

FIGS. 8A, 8B and 8C show an example of printing on standard preformed paper 6. FIG. 8A illustrates a set printing format, and encircled numerals in preprinted frames 6a–6e show a sequence with which printing initiation positions are assigned. FIG. 8B shows an example of printing data transmitted from host computer 4 to printer 3, and FIG. 8C shows the result of printing.

As shown in the drawings, for setting the printing format of the type illustrated in FIG. 8A, the printing data of FIG. 8B is sent via interface cable 5 from control unit 23 of host computer 4, to control unit 12 of printer 3. When the data inputting operation is done, control unit 12 refers to the printing format i.e., the printing initiation position data which corresponds to each frames 6a–6e, stored in BBRAM 22, and then printing head 16 begins to print this data on standard preformed paper 6 which has been laid onto a platen, (not shown in the drawings). With each subsequent LF code [OA(-hexadecimal notation)] signal, the printing initiation position is transferred to the next printing operation.

As a result, as shown in FIG. 8C, the data is printed in respective frames of standard preformed frames 6a–6e.

When the sequence proceeds from printing initiation position ④ to printing initiation position ⑤, the line feed has to be made in a reverse direction. But the reverse line feed can be eliminated and the printing process can be accelerated, if battery backup RAM 51 incorporates a page buffer of one-page data, so that after receiving the one-page data, the sequence of data in the page buffer is reversed, and actual printing is carried out in the following order: ①–⑤–②–③–④.

Because, as has been shown above, the above embodiment provides a touch panel tablet having a touch panel for entering coordinate data in the point of contact with the panel, a printing initiation position can be input directly from the touch panel and without adjusting the standard preformed paper 6 in the printer 3.

Thus, input of data can be performed in a simple and reliable manner without deviations from the positions of the printing format on the paper.

According to the above embodiment, formatting can be done very efficiently without the use of any mechanisms of the printer. Therefore, the device of the invention is applicable for a printer of any type.

The above described embodiment, however, is has a disadvantage, as follows.

More specifically, the above-described printing format input device can provide input of data only for the standard preformed paper which is not larger in size than the touch panel. Therefore, in those cases where the printing format data has to be entered for a standard preformed paper having a greater size, the printing format input device should be provided with a correspondingly larger touch panel, and this leads to an increase in costs.

A second embodiment of the invention intended to eliminate the above disadvantage will now be described in detail with reference to the accompanying drawings.

Figure 9:
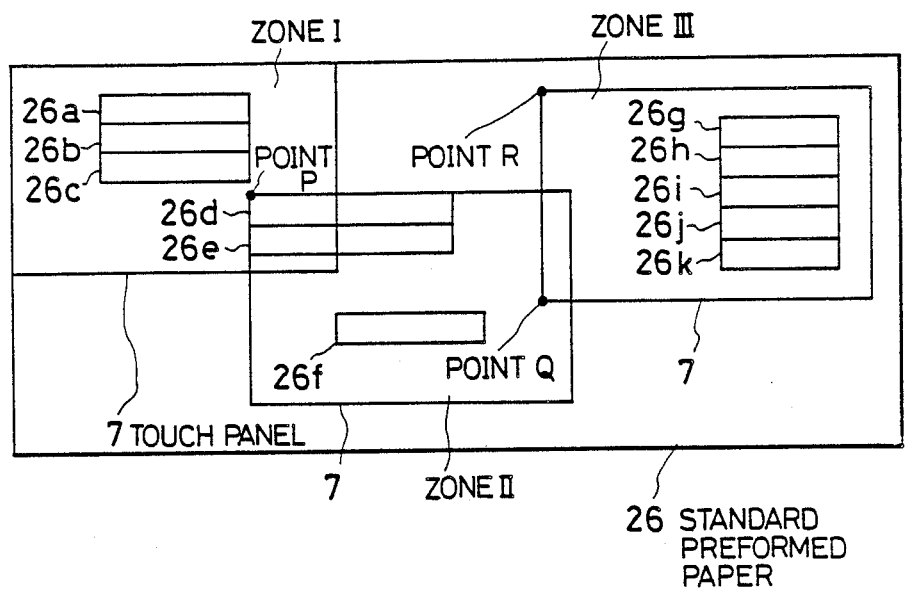
FIG. 9 is a diagram for explaining the method of inputting printing format data according to a second embodiment of the invention.
Figure 10:
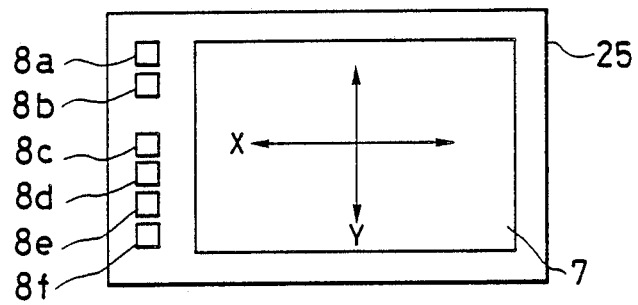
FIG. 10 is a front view of a printing format input device used in the embodiment of FIG. 9.

FIG. 9 is a diagram which is used for explanation of a method of the second embodiment of the invention for entering printing format data to a printer. FIG. 10 is a front view of a printing format input device used in association with the method illustrated in FIG. 9.

Considered first is the construction of the printing format input device 25 shown in FIG. 10, which is similar to the device of the first embodiment in that it comprises the following parts and units which are shown and described with reference to FIG. 6: the touch panel 7, the operation switch unit 8, the ROM 9, the RAM 10, and the control unit 11. As shown in FIG. 7, the above-mentioned switch unit 8 includes the input initiation key 8a, and the input completion key 8b. The following description, however, will relate to features which are different from the device of FIGS. 5–8.

More specifically, printing format input device 25 has a touch panel 7 with a horizontal axis as an abscissa axis and a vertical axis as an ordinate axis. The extreme left X coordinate has a value equal to "0", while the extreme right X coordinate is equal to "99". In a similar manner, the uppermost Y coordinate of touch panel 7 is equal to "0", while the lowermost Y coordinate is equal to "99".

Any of four corners of touch panel 7 is assigned as a position determining point or secondary reference point, while the point located in the upper left corner is used as a coordinate reference point or a primary reference point. The device is provided with operation keys 8c-8f for assigning the secondary reference point which is used for entering the printing format data in a zone. An operation key 8c corresponds to the upper left corner of the touch panel 7, an operation key 8d corresponds to the upper right corner, an operation key 8e corresponds to the lower left corner, and an operation key 8f corresponds to the lower right point. Thus, apart from input initiation key 8a and input completion key 8b, and their associated switch circuits not shown, this embodiment of the invention is constructed with additional operation keys, i.e., keys 8c to 8f, and their associated switch circuits not shown.

Control unit 11 functions as an arithmetic means for calculation of the coordinate value of the printing initiation position with respect to a primary origin in accordance with the coordinate value of the printing initiation position with respect to a secondary origin, and the coordinate value of the secondary origin with respect to the primary origin. For this purpose, ROM 9 contains a control program which corresponds to the foregoing of for use by the control unit 11.

Printer 3 and host computer 4 are the same as those described in connection with FIG. 5.

In FIG. 9, which is used for explanation of the method for input of printing format data, reference numeral 26 designates a standard preformed paper, which is greater in size than touch panel 7 of printing format input device 25. The paper 26 has frames 26a-26k preliminarily printed thereon as printing formats.

As shown in the illustrated case, all the frames 26a-26k are located in the range of the touch panel. If the standard preformed paper 26 is divided into three separate zones I, II, and III, the position determining reference point or the secondary origin P for the second zone II, is marked in the first zone I of standard preformed paper 26, e.g., by a touch pen, and in a similar manner, the secondary origin Q for the third zone III is marked in the second zone II.

When input initiation key 8a of printing format input device 25 is depressed by a finger or the like, the key depression signal is detected by control unit 11. As a result, control unit 11 sends an input initiation signal via an interface cable 2 to control unit 12 of printer 3.

When control unit 12 of printer 3 receives the above-mentioned input initiation signal, then in accordance with the control program of ROM 19, the printer 3 is transferred from a printing data receiving/printing mode to a printing format data input mode.

At that moment, control unit 11 of printing format input device 25 writes value "0" in two memory locations in RAM 10. These memory locations are used as registers OFX and OFY for indicating the position of the position determining point in the left upper corner, i.e., the coordinate reference point or the primary reference point of touch panel 7. Coordinate values equal to "0" are entered into both registers OFX and OFY.

At the next step, printing format input device 25 is superimposed onto the above-mentioned standard preformed paper 26, so that touch panel 7 is aligned with the area I. This aligning is performed in such a manner that the primary reference point (the left upper corner) of touch panel 7 coincides with the primary origin (left upper corner) of the paper 26.

When, under these conditions, the coordinates of the printing initiation points in each frame 26a, 26d and 26c in zone I are entered by sequentially touching by a touch pen (FIG. 7), the printing initiation points on the standard preformed paper as superimposed with the touch panel, the values of the entered coordinates X and Y of the points relative to the primary reference point of the panel will be read by control unit 11, and after adding the above-mentioned registers OFX(=0) and OFY(=0) to the respective coordinate values X and Y, the coordinates OFX +X and OFY+Y obtained as a result of the addition are transferred as printing format data to control unit 12 of printer 3 via an interface cable. Control unit 12 of printer 3 converts the above-mentioned printing format data into printing positions of the respective printing zones, and these positions, in turn, are sequentially memorized as printing initiation position data in BBRAM 22.

After completion of inputting the printing format data of zone I, touch panel 7 is shifted to zone II. Preparatory to this shifting operation, operation key 8c is depressed and the secondary reference point is assigned.

More specifically, a signal is produced by the depression of this key 8c and is detected by control unit 11, and the device enters the mode in which the assigned secondary reference point is identified, and this assignment is stored in RAM 10. Then, the coordinate of the position (with respect to the primary origin) into which the secondary origin of panel 7 should be transferred is calculated. Therefore, contact by means of touch pen 24 onto point P in zone I of touch panel 7 will cause control unit 11 to read the entered point X as coordinate $X_P$ and the entered point Y as coordinate $Y_P$. These coordinates $X_P$ and $Y_P$ are added to values of registers OFX and OFY of the above-mentioned RAM 10.

This process is performed for calculation of the coordinates of the position P on the paper 26 (with respect to the primary origin) into which the secondary reference point of the touch panel 7 should be relocated, for the input of the printing format data for the next zone II. As the secondary reference point designated by the above-mentioned operation key 8c coincides with the primary reference point, which is the upper left corner of touch panel 7, in the relocated position with touch panel 7 superimposed onto area II, the secondary origin P will be the point to which the primary reference point (left upper corner) of panel will be aligned when the touch panel 7 is placed to cover the zone II. Therefore, the coordinates of secondary origin P will be read out as $X_P$ and $Y_P$. These coordinates will be added to the values of the above-mentioned registers OFX and OFY, and the coordinates of the position to which the primary reference point is relocated are thus calculated.

When operations described above for the preparation for relocation of touch panel are completed, printing format input device 25 is shifted so that the secondary reference point (which happens to coincide with the primary reference point) in the upper left corner of touch panel 7 is aligned with the secondary origin P, and the touch panel 7 is thus aligned with the position of zone II. Under these conditions, printing format data will be entered using a touch pen 24 into printer 3 by contacting the printing initiation positions of frames 26d, 26e, and 26f through touch panel 7 in the same manner as for zone I. The values of the coordinates as derived from the touch panel 7 represent the position of the touch panel 7 with respect to the primary reference point of the panel and hence with respect to the secondary origin P. The coordinate values are therefore added to the coodinate values of the secondary origin with respect to the primary origin, the latter being stored in the registers OFX, OFY. By such addition, coodinate values of the printing initiation positions with respect to the primary origin are obtained.

When inputting of printing format data into zone II is completed, for inputting the data into the next zone, i.e., zone III, it is necessary to calculate the coordinates of point R, located in the upper left corner of zone III, i.e., the point into which the primary reference point of the panel 7 has to be relocated. However, these coordinates cannot be entered through direct input, because point R is beyond the boundaries of zone II which is now covered by the panel.

As a preparatory step for completion of this operation with the use of the touch panel, the operator depresses operation key 8e and thus assigns the lower left corner of the panel as the secondary reference point.

A signal generated by the depression of this key 8e will be detected by control unit 11. After identification of the secondary reference point, contact of touch pen 24 through touch panel 7 with point Q in zone II, i.e., with the point in the left lower corner of zone III, will enter the coordinates of the above-mentioned point Q, so that control unit 11 will read coordinate X of the entered point Q as $X_Q$ and coordinate Y as $Y_Q$.

On the basis of position relationships between the respective position determining points, i.e., the upper left corner and the lower left corner of touch panel, the coordinates of point R will be the following: coordinate X will be equal to $X_Q$ and coordinate Y will be equal to $Y_Q-99$. As these coordinates are relative to point P, the above-mentioned $X_Q$ coordinate will be added to the value of register OFX and $Y_Q-99$ will be added to register OFY, so that these registers OFX and OFY will finally acquire the coordinates of point R with respect to the primary origin.

As a result of the above treatment, preparation for the transfer of touch panel 7 will be completed, and printing format input device 25 can be shifted to a position in which the lower left corner of touch panel 7 coincides with the above-mentioned point Q. In other words, the touch panel will be superimposed onto zone III. Under these conditions, contact via touch panel 7 with printing initiation positions within frames 26g–26k will cause entry of the printing format to printer 3 in the same manner as has been done with regard to previous zones I and II.

If control unit 12 of printer 3 cannot accept the signal at a moment when the coordinate values are transmitted as printing format data from control unit 11 of printing format input device 25 to control unit 12 of printer 3, then the above-mentioned printing format data will be temporarily stored in RAM 10 of printing format input device 25. When transmission of the signals becomes possible, the data will be read out by control unit 11 from RAM 10 and sent to control unit 12.

After the input of printing format data of zones I, II and III of standard preformed paper 26 is completed, and input completion key 8b is depressed, the signal indicating depression of this key will be detected by control unit 11, so that control unit 11 will send an input completion signal to control unit 12, and the latter will return the mode of operation of printer 3 to an ordinary data receiving/printing mode.

Control unit 23 of host computer 4 will then transmit printing data and a line feed (LF) code to the printer, and under the command of these signals, printing head 16 will print corresponding data within frames 26a–26k of standard preformed paper 26 which was preliminarily set onto the platen (not shown) of printer 3.

Thus, as has been described, in the embodiment of the present invention described above, all four corners of touch panel 7 of the printing format input device 25 can be used as secondary reference point. Among these reference points, the one located in the upper left corner is set as the primary reference point of touch panel 7. An appropriate secondary reference point is assigned by means of operation keys 8a–8f. The relative movement of the primary reference point accompanying the movement of the touch panel 7 with respect to the primary origin of the standard preformed paper 26 is calculated on the basis of information as to which of the operation keys 8c–8f has been depressed and the subsequent input of coordinates entered through touch panel 7. The calculated values are added to the coordinates that have been stored, and the results are supplied to printer 3 as the printing format data.

When the coordinates X, Y of the point are entered through touch panel 7 during recalculation of the primary reference point and have the coordinates $X_A$, $Y_A$, the values of OFX and OFY of the coordinate reference point will undergo the following changes:

(1) depression of operation key 8c+coordinate input: OFX is replaced by the present value of $OFX+X_A$, and OFY is replaced by the present value of $OFY+Y_A$.

(2) depression of operation key 8d+coordinate input: OFX is replaced by $OFX+X_A-99$, and OFY is replaced by the present value of $OFY+Y_A$.

(3) depression of operation key 8e+coordinate input: OFX is replaced by the present value of $OFX+X_A$, and OFY is replaced by the present value of $OFY+Y_A-99$.

(4) depression of operation key 8f+coordinate input: OFX is replaced by the present value of $OFX+X_A-99$, and OFY is replaced by the present value of $OFY+Y_A-99$.

In this way, a combined operation of keys 8c–8f, together with the coordinate input through touch panel 7, can expand the area of data input onto standard preformed paper 26 of any size, so that printing format data can be entered to any such paper 26.

Of course, if the standard preformed paper 26 has dimensions smaller than touch panel 7, the data can always be input by a conventional method.

As has been shown above, according to the second embodiment of the invention, any of four corners of a touch panel in a printing format input device 1 are used as a second reference point, while one of these points is assigned as a primary reference point; the printing format input device 1 is provided with operation keys for assigning one of the four corners as the secondary point, and with arithmetic means for recalculation of the above-mentioned coordinates when the primary reference point is relocated to a new position (secondary origin). In the case when the printing format data has to be entered for printing format greater in size than the dimensions of the touch panel 7, the printing format of the above-mentioned standard preformed paper 26 is divided into several zones, and in each zone, a secondary origin of a neighbouring zone is marked. The coordinates of the position of the primary reference point when the panel 7 is placed so as to cover each zone are calculated on the basis of the combination of the information on the assignment of the secondary reference point and the input of the coordinates by means of coordinate panel 7. The touch panel 7 is superimposed onto each zone, and the input of printing format data are performed.

It has been shown above that the touch panel 7 can be used for entering a printing format for a large area, and that the data be entered to standard preformed paper 26 of any size. In distinction to the method of the first embodiment, this can be done without increasing the size of the touch panel 7 to the dimensions of the paper 26 used for printing. Because the device of this invention does not require the use of a touch panel 7, which is large it can be produced for a relatively lower price. Another result of the invention is that the device 1 is capable of inputting printing format data to a larger area than a device with a relatively large-scale touch panel.

In the embodiment described, the touch panel 7 is transparent and is placed over the standard preformed paper 26 during coordinate data input. However, the touch panel 7 need not be transparent and the standard preformed paper 26 in this case can be placed over the touch panel.

In the embodiment described, the secondary origins are marked for the respective zones. Alternatively, characters or frames preprinted on the preformed paper 26 may be utilized as the markers of the secondary origins. In this case special marking by use of a pen or the like may be omitted. What is essential is to assign the secondary origins for the respective zones.

In place of the touch panel 7, other types of coordinate data input devices can be used.

What is claimed is:

1. A method for inputting, into a printer for storage in a memory means in the printer memory, printing initiation positions for on a standard preformed paper comprising the steps of:
   providing a printing format input device, which is equipped with a touch panel capable of entering coordinate data through contact with a touch pen onto the panel,
   superimposing the touch panel with the standard preformed paper which has with a printing format already preliminarily printed on the paper; and
   entering, by means of the touch pen, coordinate data of the printing initiation positions of the printing format through the touch panel;
   whereby the input coordinate data are input into the printer as the printing format data.

2. A method according to claim 1, further comprising the step of:
   aligning a predefined primary origin on the standard preformed paper and a predefined reference point on the touch panel when superimposing the touch panel with the standard preformed paper.

3. A method according to claim 2, further comprising the steps of:
   dividing, in input of printing format data for a standard preformed paper which has a size which is greater than a size of the touch panel, the printing format of the paper into several zones;
   assigning a secondary origin for each of the zones except the zone covered when the primary reference point of the touch panel is aligned with the primary origin of the standard preformed paper;
   assigning, by actuation of switch means, one of the corners as a secondary reference point for an adjacent zone, and then entering, by means of the touch pen, the coordinate data of the secondary reference point for the adjacent zone while the primary reference point of the touch panel is aligned with the primary origin of the standard preformed paper;
   shifting the touch panel relative to the preformed paper, so that the secondary reference point on the touch panel is aligned with the secondary origin for the adjacent zone on the preformed paper;
   entering, by means of the touch pen, the coordinate data of a printing initiation position of the printing format in said adjacent zone while the secondary reference point on the touch panel is aligned with the secondary origin for the adjacent zone on the preformed paper; and
   calculating, by means of a calculating means, the coordinate value of the printing initiation position with respect to the primary origin in accordance with the coordinate value of the printing initiation position with respect to the secondary origin and the coordinate value of the secondary origin with respect to the primary origin.

4. A method according to claim 3, wherein the switch means comprises operation keys corresponding to position determining points for assignment of the position determining points.

5. A method according to claim 2, further comprising the steps of:
   dividing, in input of printing format data for a standard preformed paper which has a size greater than a size of the touch panel, the printing format of the paper into several zones; and
   assigning a secondary origin for one of the zones when the touch panel is aligned to cover another zone in which the secondary reference point is positioned;
   assigning, by actuation of switch means, one of the corners of the touch panel as a secondary reference point for said one of the zones and inputting by the touch pen, the coordinate data of the secondary origin to which the secondary reference point is to be relocated, for input of the printing initiation positions in said one of the zones;
   shifting the touch panel relative to the standard preformed paper so that the secondary reference point for said one of the zones is aligned with the secondary origin for said one of the zones,
   entering, by means of the touch pen, the coordinate data of the printing initiation position while the secondary reference position for said one of the zones is aligned with the secondary origin for said one of the zones; and
   calculating, by means of calculating means, the coordinate value of the printing initiation position with respect to the primary origin in accordance with the coordinate value of the printing initiation position with respect to the secondary origin for said one of the zones and the coordinate value of the secondary origin for said one of the zones with respect to the primary origin.

6. A method according to claim 5, wherein the switch means comprises operation keys corresponding to position determining points for assignment of the position determining points.

7. A method according to claim 2, wherein said predefined primary origin on the standard preformed paper is a corner of the standard preformed paper, and said predefined reference point on the touch panel is a corner of said touch panel.

8. A method for inputting printing initiation positions into a printer for storage in a memory means in the printer, the printing initiation positions corresponding to printing initiation positions preprinted on a standard preformed paper having a preprinted printing format, comprising the steps of:

providing a printing format input device which has a touch panel capable fo determining coordinate data at a location indicated by contact with a touch pen onto said touch panel, and which is capable of supplying said coordinate data to said memory means of said printer, superimposing said touch panel and said standard preformed paper; and applying said touch pen to said touch panel to enter coordinate data corresponding to said printing initiation positions of said printing format;

whereby input coordinate data corresponding to said printing initiation positions are input into said memory means in said printer as printing format data.

9. A method according to claim 8, wherein said memory means is a non-volatile memory.

10. A method according to claim 8, wherein said printing formal input device is a separate unit from said printer and is disconnectably connected to said printer.

11. A method of printing on a standard preformed paper by use of a printer having a memory means for storing data which indicates printing initiating positions on the standard preformed paper, said standard preformed paper having a printing format preprinted on it, comprising the steps of:

providing a printing format input device having a touch panel for entering of coordinate data by contact with a touch pen onto said touch panel;

superimposing another standard preformed paper on said touch panel, said another standard preformed paper being substantially identical to said standard preformed paper;

entering coordinate data representing said printing initiation positions of said printing format by application of said touch pen to said touch panel;

storing said coordinate data in said memory means as data indicating said printing initiating positions;

supplying print data, which is to be printed on said standard preformed paper at respective printing initiation positions, to said printer;

inserting said standard preformed paper in said printer; and printing said print data on said standard preformed paper which is in said printer starting at said respective printing initiation positions.

12. A method according to claim 11, wherein said printing format printed on said standard preformed paper include frames, and said printing initiation positions are within said frames.

13. A method according to claim 11, wherein the print data are characters.

* * * * *